(12) United States Patent
Cho et al.

(10) Patent No.: US 8,465,671 B2
(45) Date of Patent: *Jun. 18, 2013

(54) DICHROIC DYE FOR COLOR FILTER, COMPOSITION COMPRISING THE SAME FOR COLOR FILTER AND COLOR FILTER ARRAY PREPARED THEREFROM

(75) Inventors: Yong-Il Cho, Daejeon (KR); Sin-Young Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 888 days.

This patent is subject to a terminal disclaimer.

(21) Appl. No.: 12/312,493

(22) PCT Filed: Nov. 23, 2007

(86) PCT No.: PCT/KR2007/005963
§ 371 (c)(1),
(2), (4) Date: May 13, 2009

(87) PCT Pub. No.: WO2008/063033
PCT Pub. Date: May 29, 2008

(65) Prior Publication Data

US 2010/0066950 A1 Mar. 18, 2010

(30) Foreign Application Priority Data

Nov. 24, 2006 (KR) ................. 10-2006-0117123

(51) Int. Cl.
*C09K 19/00* (2006.01)
*C09K 19/06* (2006.01)
*C09K 19/52* (2006.01)

(52) U.S. Cl.
USPC ............... 252/299.1; 252/299.67; 534/823; 534/829

(58) Field of Classification Search
None
See application file for complete search history.

(56) References Cited

U.S. PATENT DOCUMENTS

| | | | |
|---|---|---|---|
| 4,596,666 A | 6/1986 | Blunck et al. | |
| 5,489,451 A | 2/1996 | Omeis et al. | |
| 6,174,394 B1 | 1/2001 | Gvon et al. | |
| 6,798,487 B1 | 9/2004 | Ohtani et al. | |
| 2009/0290214 A1 | 11/2009 | Cho et al. | |

FOREIGN PATENT DOCUMENTS

| | | |
|---|---|---|
| CA | 2366846 | 9/2000 |
| DE | 32 44 815 | 6/1984 |
| DE | 4139563 | 6/1993 |
| DE | 19910247 | 9/2000 |
| EP | 0 065 869 | 12/1982 |
| EP | 0 806 697 A2 | 11/1997 |
| JP | 2004-535483 | 11/2004 |
| JP | 2009-538957 | 11/2009 |
| KR | 10-2008-0002313 | 1/2008 |
| WO | WO 02/090447 | * 11/2002 |
| WO | WO 02/090447 A1 | 11/2002 |
| WO | WO 2004/085547 | * 10/2004 |
| WO | WO 2004/085547 A1 | 10/2004 |
| WO | WO 2005/045485 A1 | 5/2005 |
| WO | WO 2005/105932 A1 | 11/2005 |
| WO | WO 2006/064852 A1 | 6/2006 |
| WO | WO 2008/030024 A1 | 3/2008 |

OTHER PUBLICATIONS

German search report, dated Mar. 22, 2010.*
Rompp Online, Version 3.6, "Liquid crystals", 2010.

* cited by examiner

*Primary Examiner* — Michael Barker
(74) *Attorney, Agent, or Firm* — McKenna Long & Aldridge, LLP

(57) ABSTRACT

There is provided a novel dichroic dye having liquid crystal properties, dichroic properties and polymerizable reactivity, the dichroic dye being used to form a color filter layer having excellent physical properties such as dichroic ratio, heat resistance, durability, high contrast ratio and polarizing properties, a composition comprising the same for color filter, a color filter array plate (an upper plate) prepared therefrom, and a liquid crystal display comprising the color filter array plate. The dichroic dye has a structure of R1-L1-M-L2-D (wherein, D is a dichroic structure, M is a structure with liquid crystal properties, R1 is a reactive end functional group, and L and L1 are linking structures that link R1, M, and D), and the composition for forming a color filter layer includes the dichroic dye. Also, the color filter array plate, which comprises color filter layer formed of the composition of this invention and the liquid crystal display, which comprise the color filter array plate but does not requires an upper alignment film and/or a polarization plate are provided. The color filter array plate and the liquid crystal display comprising the same have excellent physical properties such as durability, polarizing degree, resolution and contrast ratio.

21 Claims, 3 Drawing Sheets

DICHROIC DYE FOR COLOR FILTER, COMPOSITION COMPRISING THE SAME FOR COLOR FILTER AND COLOR FILTER ARRAY PREPARED THEREFROM

This application claims priority to International Application No. PCT/KR2007/005963 filed on Nov. 23, 2007, which claims priority to Korean Patent Application No. 10-2006-0117123 filed on Nov. 24, 2006, both of which are incorporated by reference for all purposes, as if fully set forth herein.

TECHNICAL FIELD

The present invention relates to a novel curable dichroic dye having liquid crystal properties, dichroic properties and polymerizable reactivity, the dichroic dye being used to form a color filter layer, a composition comprising the same for a color filter layer, a color filter array plate (an upper plate) having color filter layer prepared therefrom, and a liquid crystal display comprising the color filter array plate. More particularly, the present invention relates to a novel dichroic dye having liquid crystal properties, dichroic properties and polymerizable reactivity, the dichroic dye being used to form a color filter layer having excellent physical properties such as dichroic ratio, heat resistance, durability, high contrast ratio and polarizing properties, a composition comprising the same for color filter, a color filter array plate (an upper plate) having color filter layer prepared therefrom, and a liquid crystal display comprising the color filter array plate.

BACKGROUND ART

Recently, liquid crystal displays have come into the limelight as one of the most competitive display devices in place of cathode ray tubes in view of their various merits such as light weight and low power consumption. In particular, since a thin film transistor liquid crystal display (TFT-LCD) driven by thin film transistors (TFTs) can independently drive respective pixels, it ensures a rapid response time of liquid crystals, which enables high-definition video pictures. Accordingly, the TFT-LCD has increasingly expanded to its application fields of notebook computers, wall-mounted televisions, etc.

Generally, since linear polarizers are disposed outside both glass substrates in the fabrication of color TFT-LCDs, the color TFT-LCDs are used to display information by adjusting the amount of light transmitted from the rear side through the actions of liquid crystal molecules between the glass substrates. Then, a polarizing degree is adjusted by the amount of light transmitted from the rear side using the liquid crystals, and colors are then generated while the light is passed through a color filter layer, and brightness is adjusted while the light is passed through a linear polarizer, thereby displaying information.

Color filters disposed on an upper glass plate may be divided into dye-type color filters and pigment-type color filters, depending on the materials of used organic filters, and they may be dividedly manufactured according to their manufacturing methods including a staining method, pigment dispersion, electrodeposition, a printing method, etc.

The printing method is used to prepare a color filter by printing red, green and blue inks onto a plate using a variety of printing methods. The representative printing method includes screen printing and offset printing methods, and has advantages that mass-production is possible due to the simple manufacturing process, and it is easy to selectively use materials having high heat resistance or light fastness. However, it has disadvantages that pinholes may be formed by bubbles, or colors may be spread and fast, and squareness in a pattern edge may be easily deteriorated due to the efflux of ink during the printing process.

The electrodeposition method is a method where coloring matters are extracted onto an electrode to form a coloring matter layer, that is, by dissolving or dispersing a polymer resin and a color pigment in an electrolyte solvent to extract pigment into surfaces of transparent electrodes that are in contact with the electrolyte solvent and drying the extracted pigment at high temperature.

For the electrodeposition method, an electrospreading phenomenon occurs when the transparent electrodes have a high specific resistance. Also, the transparent electrodes may be damaged since components present in the electrolyte solvent chemically react with the transparent electrodes. In particular, since the transparent electrodes have relatively low chemical resistance and unusual sensitiveness to damage, their color saturation and light transmittance are deteriorated after the electrodeposition.

Recently, color filters have been mainly prepared by a pigment dispersion method in the case of the liquid crystal display device using a thin film transistor. A composition for forming a color filter layer, which is applied onto a substrate in the pigment dispersion method, includes a polymerizable light-sensitive composition comprising a light polymerization initiator, a monomer, a binder, etc. and a monomeric organic pigment as major components, the monomeric organic pigment being used to display its colors.

The pigment dispersion method is a method where a color filter is prepared from a light-sensitive coloring composition using a photolithography process, the coloring composition being prepared by dispersing a pigment in various light-sensitive compositions. In this case, the use of pigments is desirable in the aspect of stability to light or heat. Also, the pigment dispersion method has been widely used as the suitable method to prepare a color filter, which is then used for a high-precision, high-positioning precision and large color display device, since a color filter is patterned using the photolithography process.

When a color filter is prepared using the pigment dispersion method, a color filter may be obtained by coating a glass plate with a light-sensitive composition using a spin water or a roll water, drying the composition to form a thin film, patterning, exposing and developing the thin film to form colored pixels. In this case, the color filters may be prepared by repeating the above operations with compositions including other colors. However, the conventional pigment dispersion systems have problems that contrast ratio of a color filter is deteriorated and its color variation is induced due to its low polarizing degree by the large size of the pigment particles, and it is also difficult to further improve resolution of a color filter.

In order to solve the above problems, there have been proposed techniques using a dye instead of a pigment. However, the curable compositions containing dyes have problems that their various performances, for example, light fastness, heat resistance, solubility, application uniformity and the like, are inferior to those of the curable compositions using pigments.

DISCLOSURE OF INVENTION

Technical Problem

An aspect of the present invention provides a novel dichroic dye having liquid crystal properties, dichroic properties and polymerizable reactivity, the dichroic dye being used to form a color filter layer having excellent heat resistance and durability as well as excellent physical properties such as contrast ratio, dichroic ratio and polarizing properties.

An aspect of the present invention also provides a curable composition for a color filter layer including the dichroic dye according to the present invention.

An aspect of the present invention also provides a color filter array plate (an upper plate) comprising a color filter layer formed with the curable composition according to the present invention having excellent heat resistance and durability as well as excellent physical properties such as contrast ratio, dichroic ratio and polarizing properties.

An aspect of the present invention also provides a liquid crystal display including the color filter array plate according to the present invention.

Technical Solution

According to an aspect of the present invention, there is provided a dichroic dye having a structure of R1-L1-M-L2-D.

In the formula, D is a dichroic stricture, M is a stricture with liquid crystal properties, R1 is a reactive end functional group, and L1 and L2 are linking structures which link R1, M, and D.

According to another aspect of the present invention, there is provided a composition for forming a color filter layer, comprising 1 to 98.85 parts by weight of the dichroic dye according to the present invention, and 0.15 to 5 parts by weight of other additives.

According to still another aspect of the present invention, there is provided a color filter array plate comprising color filter layer formed with the composition for forming a color filter layer of the present invention.

According to still another aspect of the present invention, there is provided a liquid crystal display comprising the filter array plate according to the present invention.

According to yet another aspect of the present invention, there is provided a liquid crystal display comprising a upper plate, the color filter array plate according to the present invention, an electrode, a liquid crystal, a lower alignment film, a lower plate and a lower polarization plate, all of which are formed in sequence as viewed from the top thereof.

BRIEF DESCRIPTION OF MAJOR PARTS IN DRAWINGS

Figure 1:
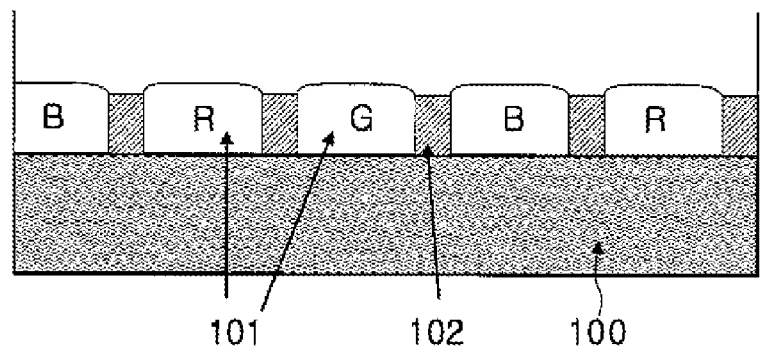
FIG. 1 is a side cross-sectional view illustrating a color filter array plate having a color filter layer formed on a substrate according to one exemplary embodiment of the present invention.

10 . . . lower polarization plate 20, 70 . . . plate
30 . . . lower alignment film 40 . . . liquid crystal
50 . . . electrode 60 . . . color filter array plate
100 . . . substrate 101 . . . color filter layer
102 . . . black matrix 103 . . . alignment film

BEST MODE FOR CARRYING OUT THE INVENTION

Hereinafter, exemplary embodiments of the present invention will be described in detail with reference to the accompanying drawings.

The present invention provides a new material (hereinafter, referred to as a dichroic dye) that has a structure of R1-L1-M-L2-D with dichroic and liquid crystal properties, the new material being used to prepare a composition for forming a color filter layer to improve dichroic ratio, polarizing properties, contrast ratio, heat resistance and durability.

The dichroic dye according to the present invention is a new material where a reactive end functional group R1, a chemical group M with liquid crystal properties, and a chemical group D with dichroic properties (referred to as "dichroic structure" hereinafter) are coupled to each other by linking groups L1 and L2.

In the novel dichroic dye according to the present invention, D represents a dichroic stricture, M represents a structure with liquid crystal properties (referred to as "liquid crystal structure" hereinafter), and R1 represents a reactive end functional group. L1 and L2 are linking structures which couple R1, M and D.

An end functional group R2 and a linking structure L3 may be further added to the other end of the dichroic dye in which a reactive end functional group R1 and a linking structure L1 are not coupled. The structure of the structure may be R1-L2-M-L2-D-L3-R2. The end functional group R2 that may be further included in the dichroic dye according to the present invention may be reactive or unreactive.

The dichroic dye according to the present invention forms a coating layer through the reactive end functional group R1 during coating and drying so as to improve durability, and particularly durability under hot and humid environments. In addition, the liquid crystal structure M enhances orientation properties, and thus improves the polarizing properties. The reactive end functional group R1, the liquid crystal structure M, and the dichroic strictures D are coupled to each other by the linking structures L, L1, etc. Also, the dichroic dye according to the present invention is not in the form of particulate materials such as the conventional pigments, and therefore the polarizing degree and contrast are not deteriorated by scattering when pigments are used instead of the dichroic dye, which leads to the improved polarizing degree and resolution.

In the dichroic dye according to the present invention, the liquid crystal structure M is coupled to the dichroic chemical structure D by the linking structures L1 and L2 or the like in order to increase the orientation properties of the dichroic structure D, and thus improve the polarizing degree. The dichroic structure D may be any of structures, among the structures of the dyes which have been generally used in this art, that give dichroic properties. For example, the dichroic structure is selected from the group consisting of, but is not limited to, azo, anthraquinone, azomethine, indigo, thioindigo, cyanine, indane, azulene, phenylene, phthaloperin, and azine dyes. The colors of the color filter layer are determined by the dichroic chemical structure D.

The dichroic azo dyes include compounds represented by the following formulas, for example:

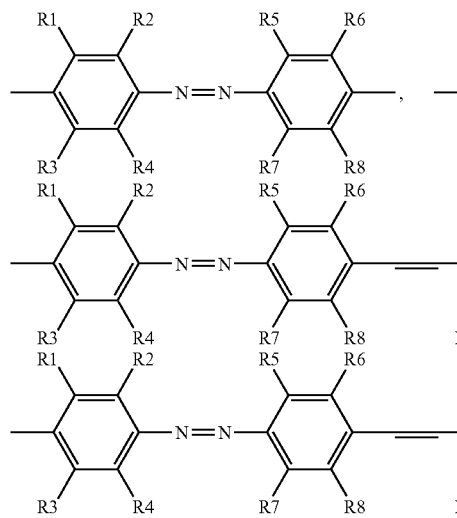

wherein, R1-R16 are substituents selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 aryloxy groups, carbamoyloxy groups, C5-C20 hetero ring oxy groups, C1-C20 aliphatic oxy carbonyloxy groups, N—C1-C20 allylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups; and R5 and R6 or R7 and R8 can be coupled to form phenyl groups.

The dichroic anthraquinone dyes include compounds represented by the following formula, for example:

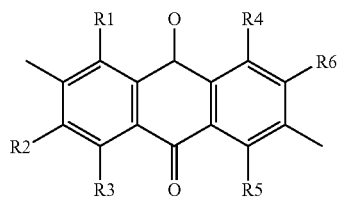

wherein, R1-R6 are substituents selected from the group consisting of hydrogen, C1-C2) straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups,

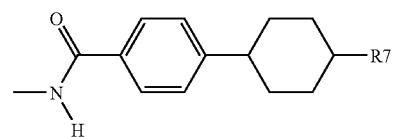

(wherein, R7 can be defined in the same manner as R1-R6), and imide groups.

The dichroic azomethine dyes include compounds represented by the following formula, for example:

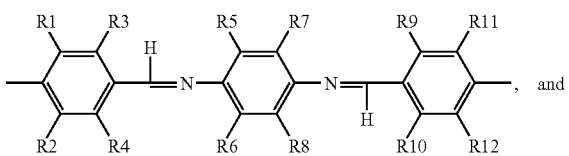

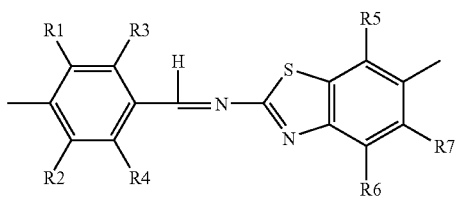

wherein, R1-R12 are substituents selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20) aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic indigo and thioindigo dyes include compounds represented by the following formula, for example:

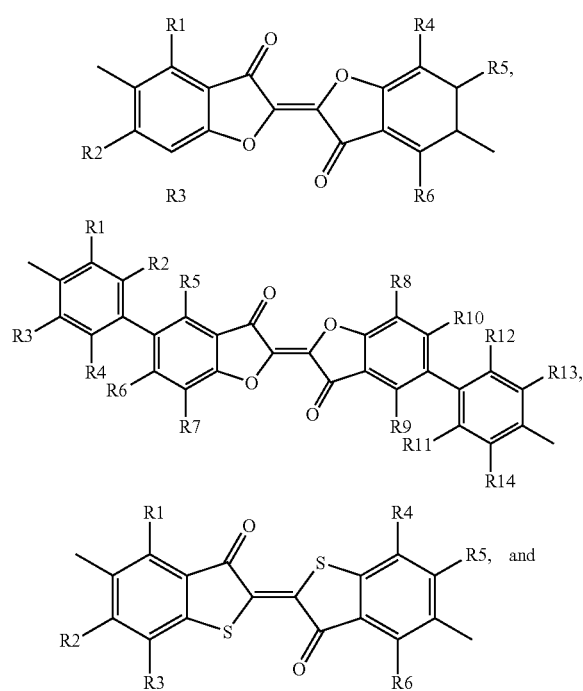

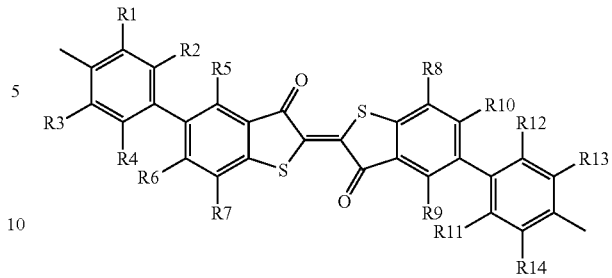

wherein, R1-R14 are substituents which are selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 aryloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic cyanine dyes include compounds represented by the following formula, for example:

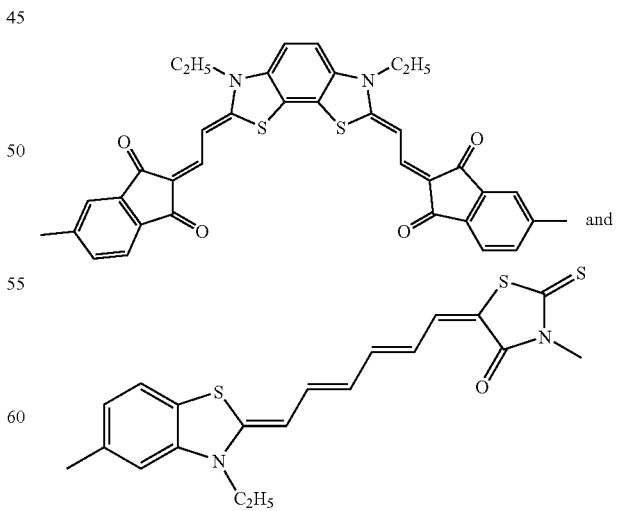

The dichroic indane dyes include compounds represented by the following formula, for example:

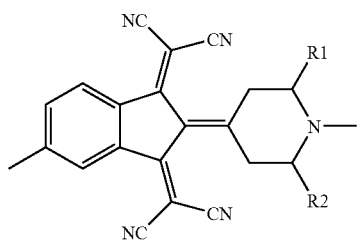

wherein, R1-R2 are substituents selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 aryloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic azulene dyes include compounds represented by the following formula, for example:

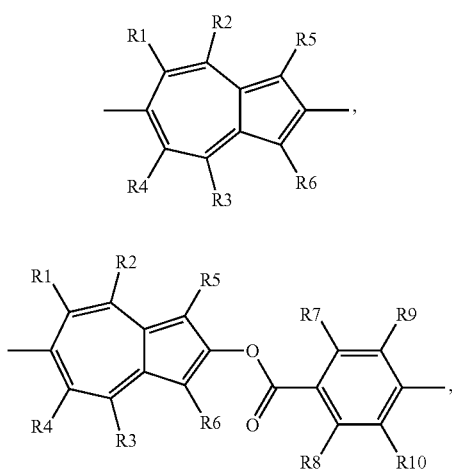

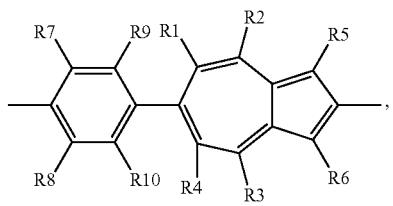

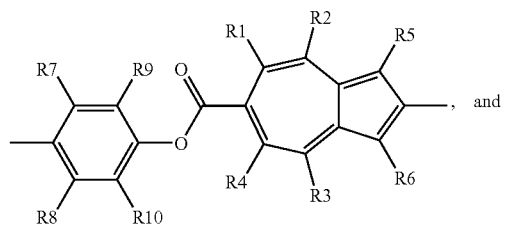

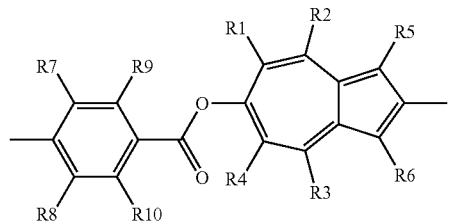

wherein, R1-R10 are substituents which are selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 aryloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic perylene dyes include compounds represented by the following formula, for example:

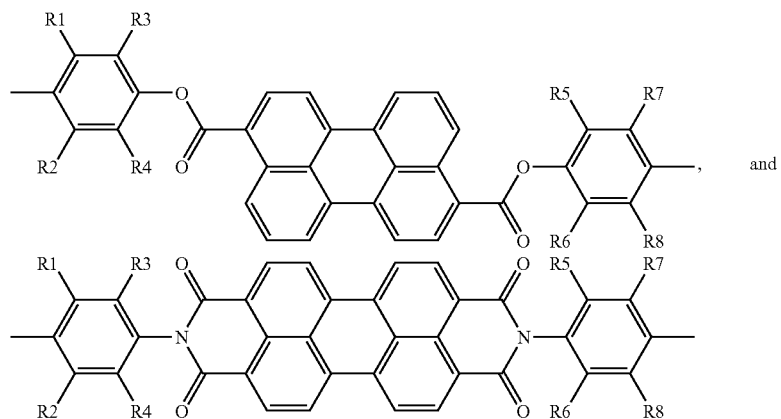

wherein, R1-R8 are substituents which is selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 allylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic phthaloperine dyes include compounds represented by the following formula, for example:

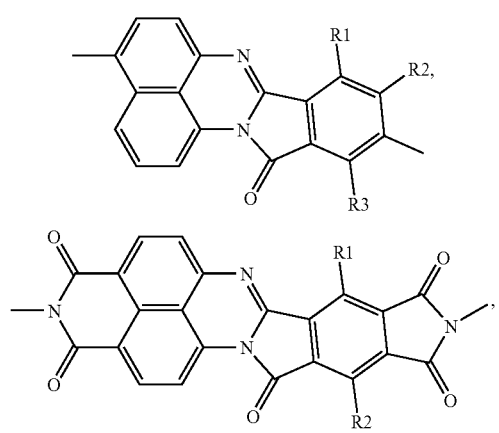

-continued

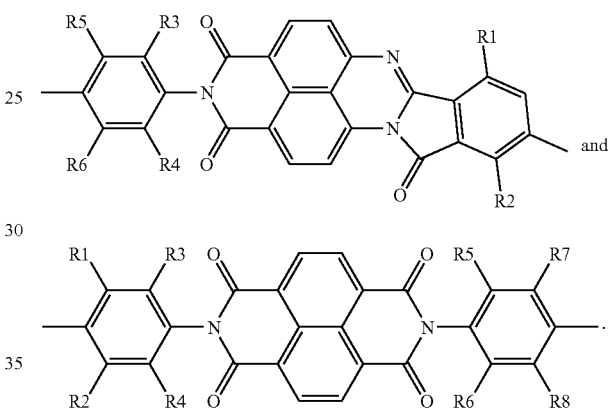

wherein; R1-R8 are substituents which is selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 aryloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloncarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic azine dyes include compounds represented by the following formula, for example:

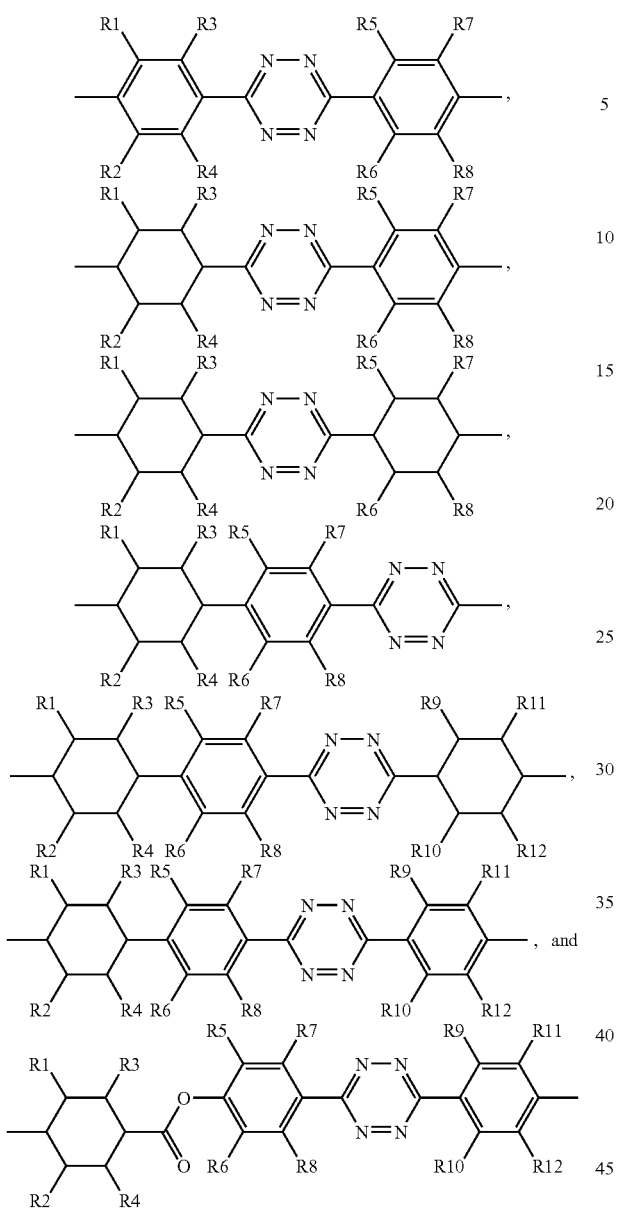

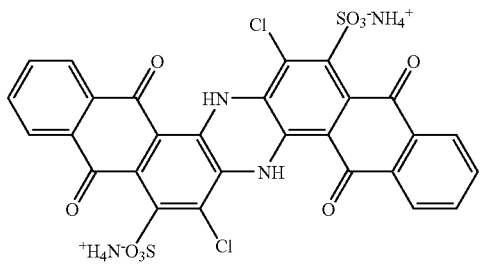

wherein, R1-R12 are substituents which are selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20) aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 aryloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic structures D may have their own liquid crystal properties as well.

In this case, the dichroic structures include, but are not limited to, compounds represented by the following formula, for example:

The liquid crystal structure M may be any of chemical structures generally known to give liquid crystal properties in the art. The presence of the liquid crystal structure M allows the dichroic structures D to increase their orientation properties, thereby improving their polarizing properties.

The liquid crystal structure M includes, but is not limited to, compounds represented by the following formulas, for example:

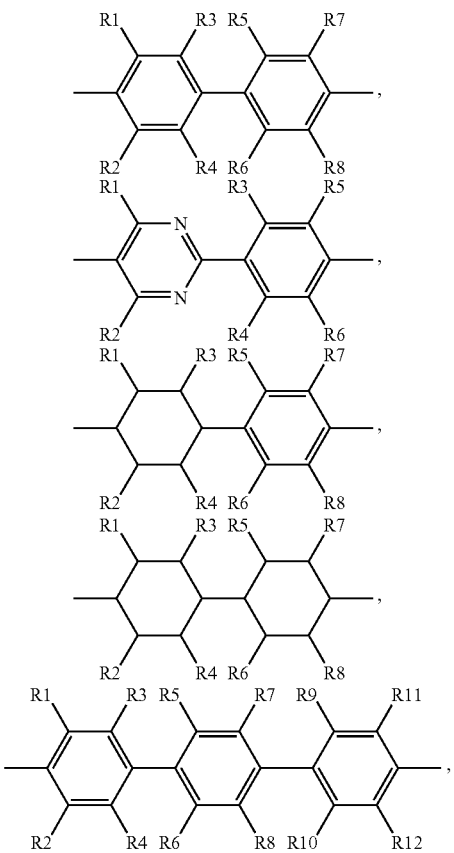

-continued

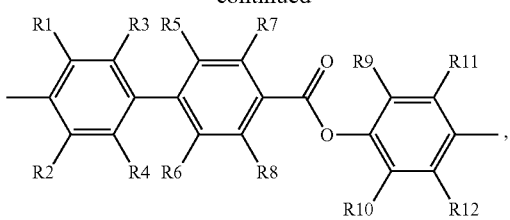

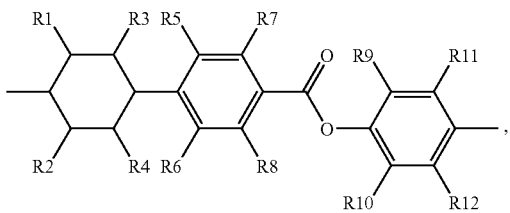

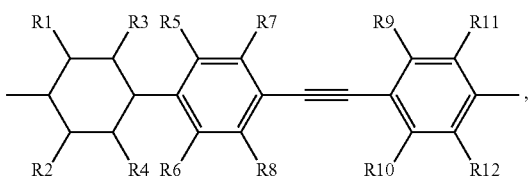

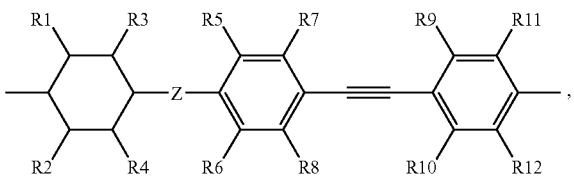

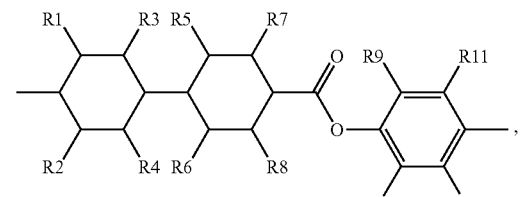

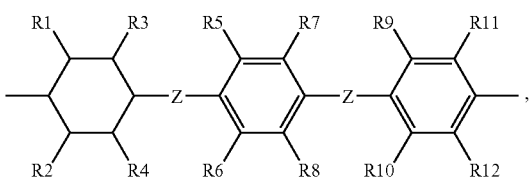

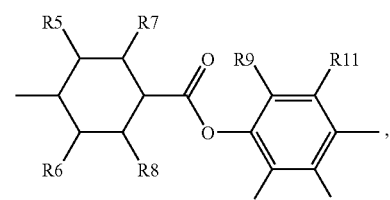

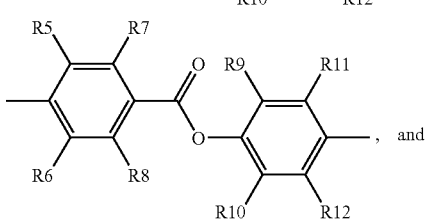, and

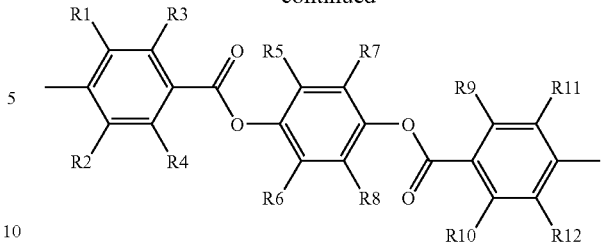

wherein, Z represents —COO—, —OCO—, —CH$_2$CH$_2$—, —CH═CH—, —C≡C— or a single bond and R1-R12 are substituents which are selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 allylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The new dichroic dye according to the present invention has a reactive end functional group R1 to facilitate the formation of a coating layer at its end so as to improve durability. Moreover, the dichroic dye may further include an end functional group R2. In this case, the end functional group R2 may be the same as or different from the end functional group R1, and may be a reactive or unreactive group generally known in this art.

The reactive functional groups R1 and R2 are one selected from the group consisting of, but are not limited to, the following structures, for example

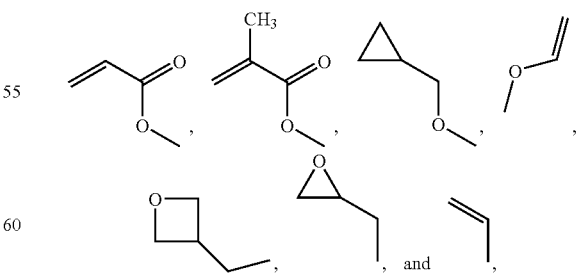

but may be independently selected from the above structures.

The unreactive end functional group R2 may be selected from the group consisting of, but is not limited to, C1-C20 alkyl groups, C1-C20 alkoxy groups, and cyclohexyl groups.

The dichroic structures D, the liquid crystal structure M, and the end functional groups R1 and R2 are coupled to each other through the linking structures L1, L2, L3, etc. The L1, L2, and L3 are any of linking structures which can couple the dichroic structure D, the liquid crystal structure M and the end functional groups R1 and R2, and they may be the same or different from each other.

The linking structure may be selected from the group consisting of

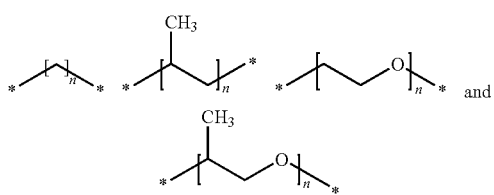

and (wherein, n represents integer ranging from 1 to 12). Furthermore, linking structures employed in the same dichroic dye stricture may be the same or different from each other.

According to the present invention, the novel dichroic dye having a stricture of R1-L1-M-L2-D or R1-L1-M-L2-D-L3-R2 may be prepared by the following process, but the present invention is not limited thereto.

The dichroic structure D which forms the dichroic dye according to the present invention is synthesized into dichroic dyes having hydroxyl or amine groups (azo, anthraquinone, azomethine, indigo, thioindigo, cyanine, indane, azulene, phenylene, phthaloperine, and azine dyes) by known methods in the art, e.g., a method described in "Organic Chemistry in Colour" (published by Springer-Verlag, 1987) or "Dichroic Dyes for Liquid Crystal Displays" (published by CRC Press, 1994), and then chemically coupled to another structures forming the dichroic dye.

Meanwhile, —OH group is introduced into an end of the liquid crystal stricture M of the dichroic dye according to the present invention, and halogen groups are introduced into both ends of the linking structure L to prepare halogen-substituted alkanes (for example, dibromoalkane or dichloroallcane) or alkane dioic acids. The linking structure with halogen ends or alkane dioic acids is then coupled to the OH end of the liquid crystal structure through ether or ester linkage. The liquid crystal structure and the linking stricture are linked to each other by alkylation or esterification.

Furthermore, the dichroic dye with hydroxyl or amine groups and the liquid crystal structure, which is coupled to the linking structure, are chemically coupled through the ether or ester linkage (amide linkage for amine). In addition, the end functional groups are linked to OH group, a halogen group, or an alkane dioic acid of the linking structure by ether or ester linkage (amide linkage for amine). Other stricture is chemically coupled to the end functional groups through the linking structure. The end functional groups and the linking structure are also chemically coupled by the alkylation reaction or esterification generally known in the art. The end functional groups may be treated to have a suitable end for alkylation, esterification or the like before they are linked to the linking structure by a chemical reaction.

As described above, the dichroic structure D, the liquid crystal structure M, the linking structures L1, L2 and L3, the end functional groups R1 and R2 may be coupled to one another by suitable chemical reactions generally known in the art, to prepare the dichroic dye having a structure of R1-L1-M-L2-D or R1-L1-M-L2-D-L3-R2 according to the present invention, if necessary. Chemical reactions for chemically linking the structures, and functional groups in the components required to carry out the chemical reactions are generally known in the art, and it will be apparent to those skilled in the art that modifications and variations can be made to prepare the dichroic dye according to the present invention.

The composition comprising the dichroic dye for a color filter is applied onto a substrate to form a color filter layer. The dichroic dye according to the present invention may be compounded in the form of a composition for forming a color filter, and then applied with simple processes such as coating to form a color filter layer. The dichroic dye according to the present invention contains light- or heat-reactive groups, and therefore the manufacturing time is shortened since the dichroic dye is rapidly cured after its application onto the substrate, which leads to the decrease in the manufacturing cost. Furthermore, the dichroic dye according to the present invention is used to form a color filter array having excellent heat stability and durability.

The composition for forming a color filter layer includes 1-98.85 parts by weight of the dichroic dye according to the present invention; and 0.15-5 parts by weight of additives. When the content of the dichroic dye according to the present invention is less than 1 part by weight, the prepared color filter layer has inferior polarizing performance. On the contrary, when the content of the dichroic dyes exceeds 98.85 parts by weight, the prepared color filter layer has deteriorated durability due to the deteriorated curing degree.

The additives include, but are not limited to, catalysts, sensitizers, stabilizers, chain transfer agents, inhibitors, accelerators, surfactants, lubricants, moisturizing agents, dispersing agents, hydrophobizing agents, bonding agents, flow enhancers, foam inhibitors, diluents, coloring agents, dyes, pigment, etc, as generally known in the art. The additives may be properly selected and mixed, when necessary. When the content of additives is less than 0.15 parts by weight, the additives do not promote coating performance sufficiently. On the contrary, when the content of additives exceeds 5 parts by weight, a coating layer prepared from the composition is adhered to the substrate with an insufficient adhesive force.

In addition, the composition for forming a color filter layer may include a curable liquid crystal compound at a content of up to 95 parts by weight, if desired. The lower limit in the content of curable liquid crystal compound is not limited since the curable liquid crystal compound is used as an optional component. The curable liquid crystal compound functions to improve orientation properties of the dichroic dye, and includes ester compounds with acrylate group, for example 4-(3-acryloyloxy-propoxy)benzoic acid o-tolyl ester, etc. When the content of the curing liquid crystal compound in the composition exceeds 95 parts by weight, the color filter layer has inferior polarizing performance and deteriorated color sense.

The curable liquid crystal compound may be, for example, at least one selected from the group consisting of, but is not limited to, the following Formulas (a) to (d), and they may be used alone or in combinations thereof:

 (a)

 (b)

-continued $$P1-S1-M'-S2-P2 \text{ and} \quad (c)$$
$$|$$
$$S3$$
$$|$$
$$P3$$

$$P3 \quad (d)$$
$$|$$
$$S3$$
$$|$$
$$P1-S1-M'-S2-P2.$$
$$|$$
$$S4$$
$$|$$
$$P4$$

In the above formulas, P-P4 are curable functional groups, and may be independently the same as or different from the reactive functional groups generally known in the art. The curable functional groups may be selected from the group consisting of, but is not limited to,

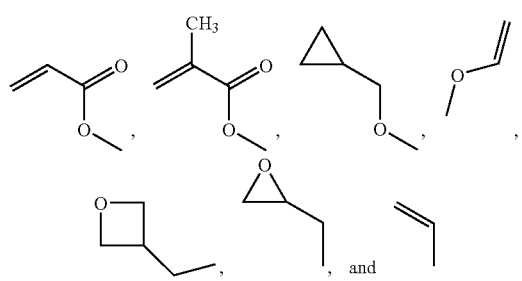

The linking structures S-S4 may be the same or different, and independently selected from the group consisting of

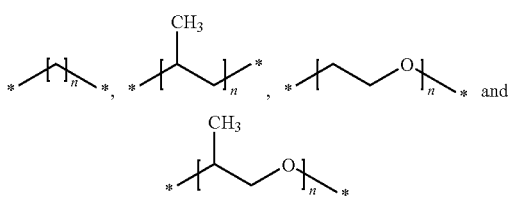

(wherein, n represents integer ranging from 1 to 12.).

The structure M' with liquid crystal properties (referred to as "liquid crystal structure" hereinafter) may be any of chemical structures that have been generally known to give liquid crystal properties in the art. The presence of the liquid crystal structure M' allows the dichroic structures D (i.e. the dichroic structures D in the dichroic dye with a structure of R1-L1-M-L2-D) to increase theirs orientation properties, thereby improving their polarizing degree.

The liquid crystal structure M' includes, but is not limited to, the following formulas, for example:

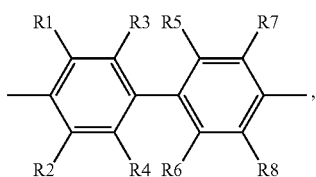

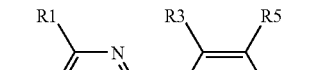

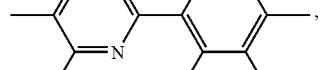

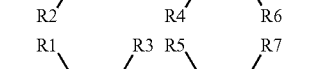

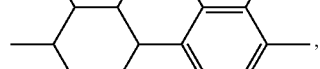

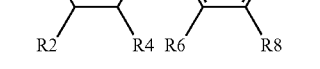

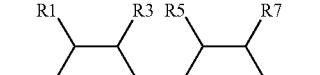

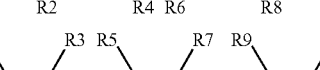

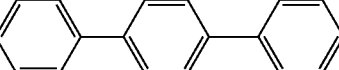

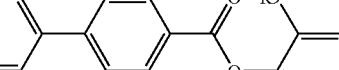

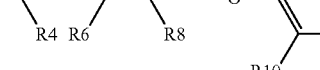

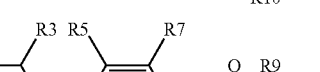

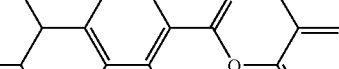

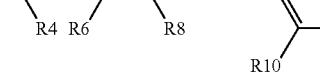

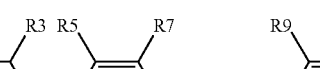

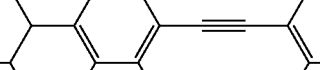

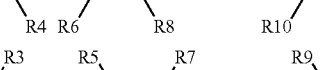

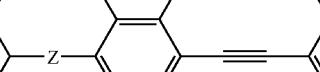

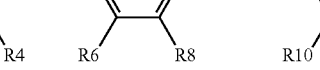

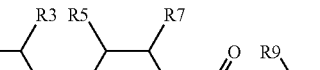

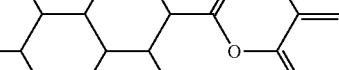

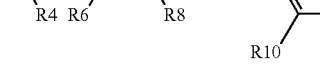

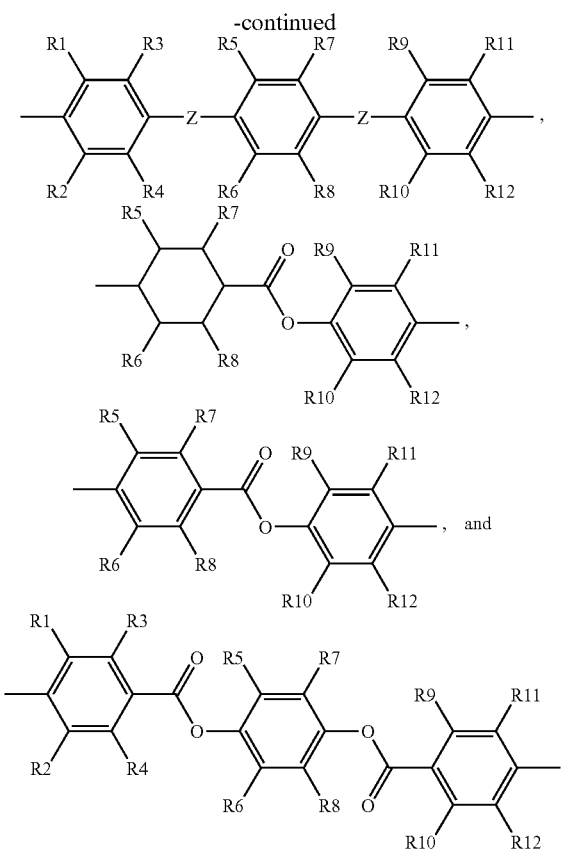

groups, C6-C20 aryl groups, C5-C20 hetero ring groups, cyano groups, C1-C20 carboxyl groups, carbamoyl groups, C1-C20 aliphatic oxy carbonyl groups, C6-C2) aryl oxy carbonyl groups, C1-C20 acyl groups, hydroxyl groups, C1-C20 aliphatic oxy groups, C6-C20 aryloxy groups, C1-C20 aryloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The end functional group R' is selected from the group consisting of H, F, Cl, Br, I, CN, SCN, $SF_5H$, $NO_2$, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), C1-C20 alkoxy groups, and C1-C20 aliphatic groups.

Furthermore, four (4) curable liquid crystal compounds, which are represented by the following formulas and disclosed in Korean Patent Publication No. 2003-0089499, may be used as the liquid crystal compound. The curable liquid crystal compounds represented by the following formulas may be used alone or in combinations thereof. More particularly, the compounds of the following formulas may be mixed with the composition (commercially available from Merck and Co., Ltd.,) with homogeneous alignment, and then used herein.

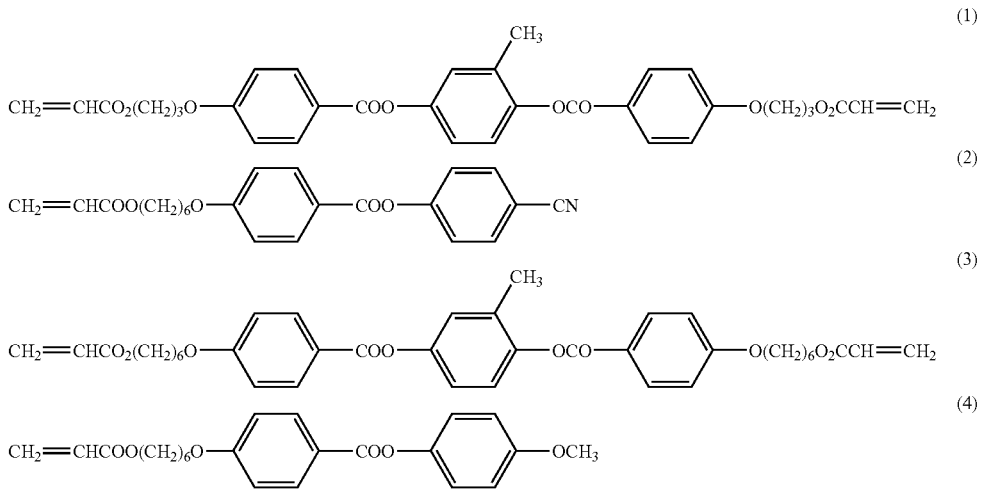

wherein, Z represents —COO—, —OCO—, —$CH_2CH_2$—, —CH═CH—, —C≡C— or a single bond and R1-R12 are substituents selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino The composition for forming a color filter layer may also includes 1 to 10 parts by weight, and preferably 2 to 7 parts by weight of a curing agent. When the composition for forming a color filter is applied to the substrate and cured using an electron beam, the composition does not need to be mixed with an additional curing agent. However, when the composition for forming a color filter layer is subject to a light or heat curing process, and dried after the coating process, an additional curing agent should be mixed with the composition.

The curing agent may be any one generally used in the art, but the present invention is not particularly limited thereto.

For example, the curing agent includes light polymerization initiators based on ultraviolet rays, for example, one or more selected from the group consisting of at least one active halogen compound selected from the group consisting of halomethyl oxadiazole compounds and halomethyl-s-triazine compounds, 3-aryl-substituted coumarin compounds, benzophenol compounds, acetophenone compounds and derivatives thereof, cyclopentadiene-benzene-Fe complex and salts thereof, and oxime compounds.

The halomethyl oxadiazole compounds provided as the active halogen compounds include, for example, 2-halomethyl-5-vinyl-1,3,4-oxadiazole, 2-trichloromethyl-5-styryl-1,3,4-oxadiazole, 2-trichloromethyl-5-(p-cyanostyryl)-1,3,4-oxadiazole, 2-trichloromethyl-5-(p-methoxystyryl)-1,3,4-oxadiazole compounds, etc.

The halomethyl-s-triazine compounds provided as the active halogen compounds include, for example, vinyl-halomethyl-s-triazine compounds, 2-(naphtho-1-yl)-4,6-bis-halomethyl-s-triazine compounds, 4-(p-aminophenyl)-2,6-di-halomethyl-s-triazine compounds, etc.

In particular, the halomethyl-s-triazine compounds include, for example, 2,4-bis(trichloromethyl)-6-p-methoxystyryl-s-triazine, 2,6-bis(trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bis-trichloromethyl-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, 2-(4-butoxy-naphtho-1-yl)-4,6-bis-trichloromethyl-s-triazine, 2-[4-(2-methoxyethyl)-naphtho-1-yl]-4,6-bis-trichloromethyl-s-triazine, 2-[4-(2-ethoxyethyl)-naphtho-1-yl]-4,6-bis-trichloromethyl-s-triazine, 2-[4-(2-butoxyethyl)-naphtho-1-y1]-4,6-bis-trichloromethyl-s-triazine, 2-(2-methoxy-naphtho-1-yl)-4,6-bis-trichloromethyl-s-triazine, 2-(6-methoxy-5-methyl-naphtho-2-yl)-4,6-bis-trichloromethyl-s-triazine, 2-(6-methoxy-naphtho-2-yl)-4,6-bis-trichloromethyl-s-triazine, 2-(5-methoxy-naphtho-1-yl)-4,6-bis-trichloromethyl-s-triazine, 2-(4,7-dimethoxy-naphtho-1-yl)-4,6-bis-trichloromethyl-s-triazine, 2-(6-ethoxy-naphtho-2-yl)-4,6-bis-trichloromethyl-s-triazine, 2-(4,5-dimethoxy-naphtho-1-yl)-4,6-bis-trichloromethyl-s-triazine, 4-[p-N,N-di(ethoxycarbonylmethyl)aminophenyl]-2,6-di(trichloromethyl)-s-triazine, 4-[o-methyl-p-N,N-di(ethoxycarbonylmethyl)aminophenyl]-2,6-di(trichloromethyl)-s-triazine, 4-(p-N,N-di(chloroethyeaminophenyl)-2,6-di(trichloromethyl)-s-triazine, 4-[o-methyl-p-N,N-di(chloroethyl)aminophenyl]-2,6-di(trichloromethyl)-s-triazine, 4-(p-N-chloroethylaminophenyl)-2,6-di(trichloromethyl)-s-triazine, 4-(p-N-ethoxycarbonylmethylaminophenyl)-2,6-di(trichloromethyl)-s-triazine, 4-[p-N,N-di(phenypaminophenyl]-2,6-di(trichloromethyl)-s-triazine, 4-(p-N-chloroethylcarbonylaminophenyl)-2,6-di(trichloromethyl)-s-triazine, 4-[p-N-(p-methoxyphenyl)carbonylaminophenyl]-2,6-di(trichloromethyl)-s-triazine, 4-[m-N,N-di(ethoxycarbonylmethyl)aminophenyl]-2,6-di(trichloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4[o-bromo-p-N,N-di(ethoxycarbonylmethyl)aminophenyl]-2,6-di(trichloromethyl)-s-triazine, 4-[o-chloro-p-N,N-di(ethoxycarbonylmethyl)aminophenyl]-2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-p-N,N-di(chloroethyl)aminophenyl]-2,6-di(trichloromethyl)-s-triazine, 4-(m-bromo-p-N-ethoncarbonylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoncarbonylmethylaminophenyl)-2,6-di(trichloromethyl)-s-triazine, 4-(o-chloro-p-N-ethoncarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine, 4-(o-fluoro-p-N-chloroethylaminophenyl)-2,6-di(trichloromethyl)-s-triazine, etc. In addition, the curing agent as the light polymerization initiator includes IRGACURE series (e.g., IRGACURE 651, IRGACURE 184, IRGACURE 500, IRGACURE 1000, IRGACURE 149, IRGACURE 819, and IRGACURE 261) from Ciba Specialty Chemicals, DAROCUR series (e.g., DAROCUR 1173), 4,4'-bis(diethylamino)-benzophenone, 2-(o-benzoyloxime)-1-[4-(phenylthio)phenyl]-1,2-octanedione, 1-(o-acetyl oxime)-1-[9-ethyl-6-(2-methylbenzoyl)-9H-carbazol-3-yl]ethanone, 2-benzyl-2-dimethylamino-4-morpholinobutyrophenone, 2,2-dimethoxy-2-phenylacetophenone, 2-(o-chlorophenyl)-4,5-diphenylimidazolyl dimer, 2-(o-fluorophenyl)-4,5-diphenylimidazolyl dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-(2,4-dimethoxyphenyl)-4,5-diphenylimidazolyl dimer, 2-(p-methylmercaptophenyl)-4,5-diphenylimidazolyl dimer, benzoinisopropylether, etc. The curing agents may be used along or in combinations thereof.

When the content of the curing agent is less than 1 part by weight, a curing degree is low. On the contrary, when the content of the curing agent exceeds 10 parts by weight, the hardness of a cured film is deteriorated.

Further embodiment of the present, a color filter array plate comprising color filter layer formed with the composition of the present invention is provided. Components constituting the composition for forming a color filter layer are mixed in an appropriate solvent, and the resulting mixture is coated onto a substrate and cured to form a color filter layer. The solvent used in the composition according to the present invention, and the solid content in the composition may be easily and optionally selected to meet the purpose of the present invention as generally known in the art, but the present invention is not particularly limited thereto.

The color filter layer may be prepared by coating a substrate with the composition comprising the dichroic dye for a color filter layer and curing the composition.

Figure 2:
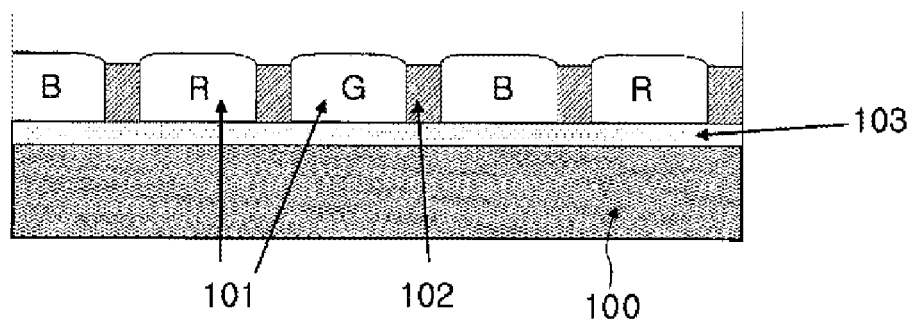
FIG. 2 is a side cross-sectional view illustrating a color filter array plate comprising an alignment layer formed on the substrate and a color filter layer formed on the alignment layer according to one exemplary embodiment of the present invention.

Cross-sectional views illustrating a color filter array plate comprising a color filter layer formed with the composition of the present invention according to one exemplary embodiment of the present invention are shown in FIGS. 1 and 2. For the convenience, the color filter array plate according to the present invention is further explained referring the FIGS. 1 and 2. For the color filter array plate as shown in FIGS. 1 and 2, materials of other parts are generally known in the art, except that the color filter layer is formed of the composition for a color filter layer according to the present invention.

As shown in FIG. 1, the color filter array plate according to the present invention comprises a substrate 100, and black matrixes (B/M) 102 and color filter layers 101 formed on the substrate 100. Red, green and blue color filter layers 101 are disposed between the black matrixes 102. The black matrixes 102 are generally disposed between the color filter layers 101 and installed to shield a reverse tilted domain which is formed between a part in which pixel electrodes of the array plate are not formed and its neighboring part of the pixel electrodes. Also, the black matrixes 102 function to prevent the increase in current leakage by preventing direct exposure of light to thin film transistors that are used as switching elements of the array plate.

The composition for forming a color filter layer is applied onto the substrate using any of the thin film-coating methods that have been generally used to form a color filter layer in the art, for example a masking method, an ink-jet method, spin-coating, blade-coating, cast coating, ink-jet coating or roll coating methods, etc., but the present invention is not particularly limited thereto. The composition for forming a color filter layer is preferably coated so that a thickness of the finally cured color filter layer can be adjusted to a thickness range of 0.1 to 10 μm, and preferably 0.3 to 7 μm. When the thickness of the thin film is less than 0.1 μm, the visible light is not linearly polarized sufficiently, and the thin film has an inferior color sense, whereas a linear polarizing degree of the thin film is deteriorated due to the poor orientation of the composition when the thickness of the thin film exceeds 10 μm.

The composition for forming a color filter layer is coated onto the substrate, and then cured to form a color filter layer. Since the composition for forming a color filter layer is cured using the curing processes including, but are not limited to, electron-beam curing, heat curing and UV curing processes, prepared is a color filter array plate having a color filter layer formed on the substrate, as shown in FIG. 1. As described above, the electron-beam curing process does not require an additional curing agent, but a curing agent should be mixed with the composition for forming a color filter layer in the case of the heat curing or UV curing process, as described above.

The color filter array plate including the color filter layer has excellent heat resistance and durability as well as excellent physical properties such as dichroic ratio, contrast ratio and polarizing properties. Furthermore, when the color filter layer array plate prepared with the above-mentioned dichroic dye is used for LCD, the orientation of the coated dichroic dye is one of important factors.

Accordingly, in order to improve the orientation of the dichroic dye, a color filter array plate may be prepared by directly giving orientation to the substrate by itself or forming an additional alignment film on a substrate, followed by coating the substrate or an alignment film with the composition for forming a color filter layer to form a color filter layer. That is, after the endowment of orientations to the substrate, the composition for forming a color filter layer is then coated onto the substrate and cured to prepare a color filter array plate, which includes a substrate 100; and a black matrix 102 and a color filter layer 101 formed on the substrate 100, as shown in FIG. 1. The orientation in the substrate may be achieved by forming unevenness in a surface of the substrate using a rubbing method to give directionality.

When the alignment film is formed on the substrate, and the composition for forming a color filter layer is then coated onto the alignment film and cured to prepare a color filter array plate, which comprises a substrate 100; an alignment film 103 formed on the substrate 100; and a black matrix 102 and a color filter layer 101 formed on the alignment film 103, as shown in FIG. 2. The additional alignment film formed on the substrate may be prepared by forming an additional alignment layer on a substrate and subjecting the alignment layer to a rubbing or photo alignment process to give orientation to molecules in the alignment layer.

The additional alignment film may be formed of at least one selected from the group consisting of, but is not limited to, azo compounds, polyimide, polyamide, cinnamic acid esters, and auric acids, as generally known in the art. They may be used along or in combinations thereof.

In order to form a polyimide film used as a rubbed alignment film, a polymer solution of auric acids is applied to a surface of glass and imidized around 200° C.

That is, a polymer of auric acids is generally imidized at high temperature to form an alignment film. In the present invention, however, a polymer film of auric acids may be used as the alignment film without undergoing the imidization of auric acids. When the additional alignment film is formed as described above, it is possible to give orientation properties to the alignment film using the rubbing or photo alignment process. Namely, a thin film may be manufactured into an alignment film by rubbing the thin film to give unevenness to a surface of the thin film, and orientations to molecules that constitute the thin film. The alignment film prepared thus functions to arrange liquid crystal molecules in certain directions since the presence of the alignment film further gives orientations to the liquid crystal structure of the color filter layer formed on the alignment film.

Meanwhile, as the photo alignment process, a non-contact surface treatment may be also carried out to give anisotropy to a thin film by irradiating polarized ultraviolet rays to the polarization film.

The photo alignment process is desirable in view of productivity because the generation of static electricity, scratches on the surface of the film, increased impurities by dusts or the like are cuased during the rubbing process.

According to the above-mentioned processes of the present invention, it is possible to provide the color filter array plate including the substrate 100 with orientation properties; and the black matrix 102 and the color filter layer 101 formed on the substrate 100 as shown in FIG. 1, and the color filter array plate including the substrate 100; the alignment film 103 formed on the substrate 100; and the black matrix 102 and color filter layer 101 formed on the alignment film 103 as shown in FIG. 2.

The color filter layer of the color filter array plate according to the present invention has a cross-linkage stricture, and therefore it has excellent durability and heat resistance under hot and humid conditions, which prevents the discoloration and the deterioration in polarizing properties of the color filter layer. Also, scattering is prevented and superior physical properties such as contrast ratio, resolution and polarizing properties are provided since particulate materials such as pigments are not used in the composition.

Furthermore, the liquid crystal display including the color filter array plate according to the present invention is also provided.

Figure 3:
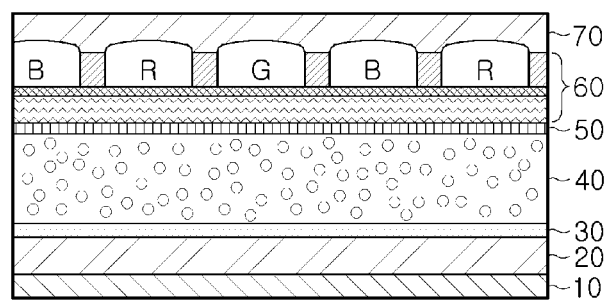
FIG. 3 is a side cross-sectional view illustrating a liquid crystal display including the color filter array plate according to one exemplary embodiment of the present invention.

As one example of the liquid crystal display devices comprising the color filter array plate according to the present invention, a liquid crystal panel is provided, comprising a upper plate 70, the color filter array plate 60 of the present invention, an electrode 50, a liquid crystal 40, a lower alignment film 30, a lower plate 20 and a lower polarization plate 10, all of which are formed in sequence as viewed from the top thereof, as shown in FIG. 3. Components and arrays of the liquid crystal display device are generally known in the art, it is considered that the liquid crystal display device according to the present invention includes the liquid crystal display device of FIG. 3, and its modifications as well.

Meanwhile, the liquid crystal display device including the color filter array plate according to the present invention does not need an additional upper alignment film and/or a polarization plate since the liquid crystal display device itself functions as the alignment film and the polarization plate. Therefore, the color filter array plate of the present invention may be used as one of substitute plates for the convention color filter layers and polarization plates. Also, a simplified liquid crystal display system may be provided since the color filter array plate according to the present invention is used in the liquid crystal display system. The liquid crystal display according to the present invention may be applied to all kinds of display modes in which the conventional polarization plates and color filters have been used, for example including, but are not limited to, a vertical alignment mode (VA mode), an in-plane switching mode (IPS mode), a twisted nematic mode (TN mode), a supertwisted nematic mode (STN mode) and a fringe field switching mode (FFS mode).

MODE FOR THE INVENTION

Hereinafter, exemplary embodiments of the present invention will be described in detail with reference to the accompanying drawings. However, it is considered that the description proposed herein is just a preferable example for the purpose of illustrations only, not intended to limit the scope of the invention, so it should be understood that other equivalents and modifications could be made thereto without departing from the spirit and scope of the invention.

Synthetic Example 1

(1) Synthesis of 4-(6-bromo hexyloxy)phenyl 4-{[6-(acryloyloxy)hexyl]oxy}benzoate (Formula (5))

As expressed in the following reaction scheme, hydroquinone (1) (4.5 g) and 1,6-dibromo hexane (2) (10 g) were dissolved in methanol (100 ml) at room temperature. Potassium hydroxide (2.3 g) was added to the mixture solution, and the resulting solution was then refluxed at 60° C. overnight. Then, the resulting reaction mixture is cooled to room temperature, and methanol was removed from the reaction mixture through evaporation, and the product was then extracted three times with water (100 ml) and ethyl acetate (100 ml) (200 ml×3). After removing water with magnesium sulfate and evaporating the solvent, the reaction product was refined by column chromatography (eluent: ethyl acetate/hexane=1/5) to obtain 4.4 g of 4-(6-bromohexyloxy)phenol (3).

4-{[6-(acryloyloxy)hexyl]oxy}benzoic acid (4) (2.8 g) was dissolved in tetrahydrofuran (THF) (100 ml) at room temperature, and the resulting mixture was then adjusted to 0° C. Then, thionyl chloride (12 ml, 1M in THF) was added to the mixture, and the resulting mixture solution was stirred for 30 minutes. Subsequently, 4-(6-bromohexyloxy)phenol (2.5 g) and triethylamine (13 ml) were added to the mixture solution, and the resulting mixture is stirred at 0° C. for one hour, and then stirred at room temperature overnight. Then, an aqueous saturated ammonium chloride solution was poured into the reaction mixture to stop the reaction. The reaction product was extracted three times with ethyl acetate (50 ml) (50 ml×3). After removing water with magnesium sulfate and evaporating the solvent, the reaction product was refined by column chromatography (eluent: ethyl acetate/hexane=1/2) to obtain 4-(6-bromo hexyloxy)phenyl 4-{[6-(acryloyloxy)hexyl]oxy}benzoate (5) (3 g).

(2) Synthesis of {{[(4-phenyl-diazine)-1-naphthyl-diazine]-phenyloxy}6-hexyloxy}4-phenyl 4-{[6-(acryloyloxy)hexyl]oxy}benzoate (formula (I))

(I)

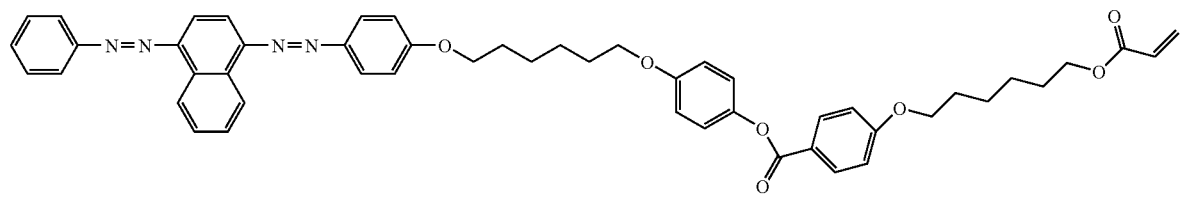

The obtained 4-(6-bromo hexyloxy)phenyl 4-{[6-(acryloyloxy)hexyl]oxy}benzoate (5) (200 mg), Disperse Orange 13 (6) (128 mg), K₂CO₃ (150 mg), and butylated hydroxytoluene (BHT) (5 mg) were dissolved in acetone (20 ml) at room temperature. The reaction mixture was stirred at 70° C. overnight. Then, an aqueous saturated ammonium chloride solution was poured into the reaction mixture to stop the reaction. The reaction product was extracted three times with ethyl acetate (50 ml) (50 ml×3). After removing water with magnesium sulfate and evaporating the solvent, the reaction product was refined by column chromatography (eluent: ethyl acetate/hexane=1/3) to obtain {{[(4-phenyl-diazine)-1-naphthyl-diazine]-phenyloxy}6-hexyloxy}4-phenyl 4-{[6-(acryloyloxy)hexyl]oxy}benzoate (I) (300 mg).

Reaction Scheme:
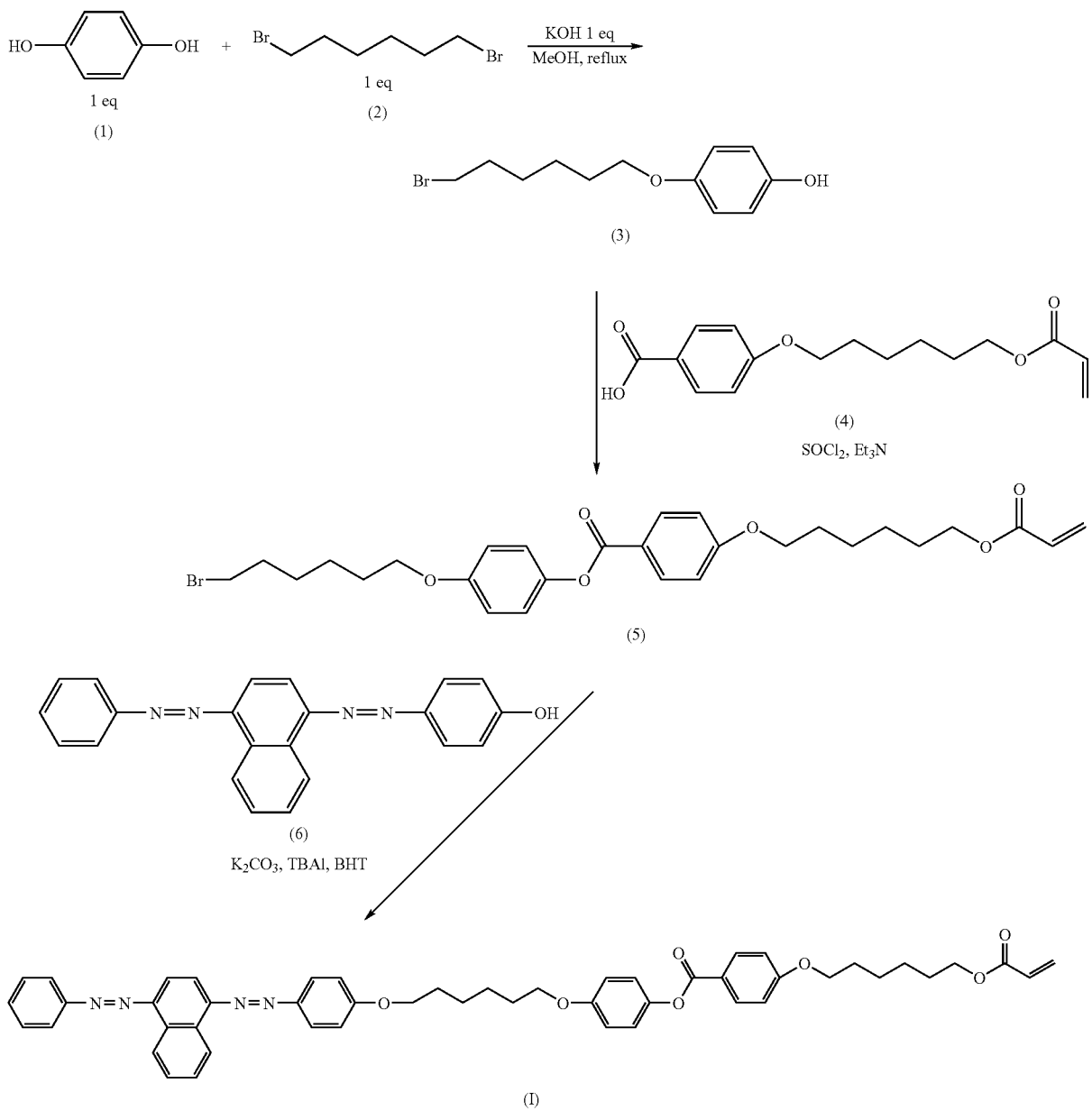
Synthetic Example 2
Synthesis of {{[(4-normalhexyl-phenyl-diazine)-1-naphthyl-diazine]-phenyloxy}6-hexyloxy}4-phenyl, 4-{[6-(acryloyloxy)hexyl]oxy}benzoate (formula (II))
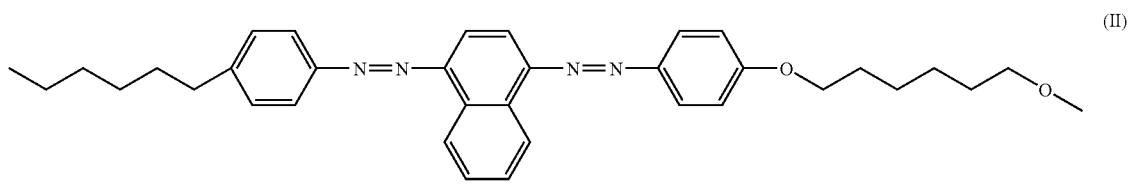

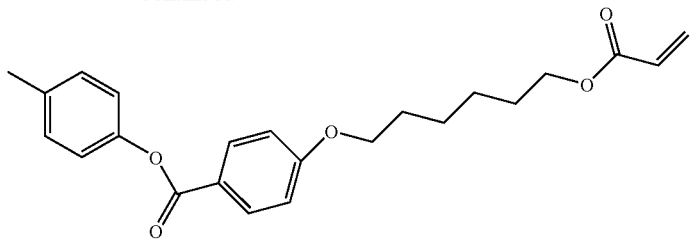

4-(6-bromo hexyloxy)phenyl 4-{[6-(acryloyloxy)hexyl]oxy}benzoate (formula (5) prepared in process (1) of synthetic example 1) (200 mg), {{[(4-normalhexyl-phenyl) diazenyl]-1-naphthyl}diazenyl}-4-phenol (135 mg), $K_2CO_3$ (150 mg), and BHT (5 mg) were dissolved in acetone (20 ml) at room temperature. The reaction mixture was stirred at 70° C. overnight. Then, an aqueous saturated ammonium chloride solution was poured into the reaction mixture to stop the reaction. The reaction product is extracted three times with ethyl acetate (50 ml) (50 ml×3). After removing water with magnesium sulfate and evaporating the solvent, the reaction product is refined by column chromatography (eluent: ethyl acetate/hexane=1/5) to obtain {{[(4-normalhexyl-phenyl-diazine)-1-naphthyl-diazine]-phenyloxy}6-hexyloxy}4-phenyl, 4-{[6-(acryloyloxy)hexyl]oxy}benzoate (formula (II)) (300 mg).

Synthetic Example 3

(1) Synthesis of 4-(6-acryloyloxy-hexyloxy)-benzoic acid 4-(5-bromo-phenyloxy)-phenyl ester 4-(6-acryloyloxy-hexyloxy)-benzoic acid 4-(5-bromo-phenyloxy)-phenyl ester was synthesized in the same manner as the step (1) of Synthetic example 1, except that 1,5-dibromo pentane is used instead of 1,6-dibromo hexane in the reaction with hydroquinone which is the first reaction in the step (1) of Synthetic example 1.

(2) Synthesis of {{[(4-phenyl-diazine)-1-naphthyl-diazine]-phenyloxy}6-pentyloxyl}4-phenyl 4-{[6-(acryloyloxy)hexyl]oxy}benzoate (formula (III))

Disperse Orange 13 (147 mg) and $K_2CO_3$ (155.43 mg) were dissolved in acetonitrile (30 ml) at room temperature, and the resulting mixture solution was stirred for about 15 minutes. Then, 4-(6-acryloyloxy-hexyloxy)-benzoic acid 4-(5-bromo-phenyloxy)-phenyl ester (synthesized in the step (1) of Synthetic example 3) (200 mg) and BHT (33.04 mg) were additionally added to the mixture solution and the resulting mixture solution was boiled for 18 hours.

The resulting reaction mixture was washed twice with a saturated aqueous $NH_4Cl$ solution to neutralize the reaction mixture, and then washed once with a saturated aqueous NaCl solution to remove remnants, in the form of salt, remaining in the organic layer. The organic layer was dried, and then separated on a column (10:1, hexane:EtOAc) to obtain a compound (221 mg, yield: 73%) of Formula III.

Example 1

Preparation of Color Filter Array Plate

The composition including the dichroic dye prepared in Synthetic example 1 was used to form a color filter layer on a glass plate.

2% by weight (wt %) of an alignment layer-forming solution (prepared by dissolving 2 wt % of polyacrylate, which has a photosensitive functional group of methoxycinnamate (MPN-Ci), in 98 wt % of cyclopentanone (CPO)) was spin-coated on a glass substrate plate at 1500 rpm for 30 seconds to have a dried thickness of 1000 Å and then dried at 80° C. for one and a half minute to remove a solvent from a coating layer. Then, the coating layer was exposed for 5 seconds to polarized UV rays to give orientation properties. Here, the polarized UV rays were generated with a high-pressure mercury lamp with an intensity of 200 mW/cm² used as a light source, and a wire-grid polarizer (commercially available from Moxtek, Inc.) used to polarize a film.

The prepared alignment layer was coated with the composition including the dichroic dye for a color filter layer to prepare a color filter array plate.

20 wt % of the composition for forming a color filter layer was prepared in the form of solution by mixing the dichroic dye synthesized in Synthetic example 1 and a liquid crystal compound RMM17™ (commercially available from Merck and Co., Ltd.) at a weight ratio of 5:95 and dissolving the resulting mixture in chloroform. Since the liquid crystal compound RMM17™ contains 5 wt % of a curing agent, an additional curing agent does not need to be added to the composition.

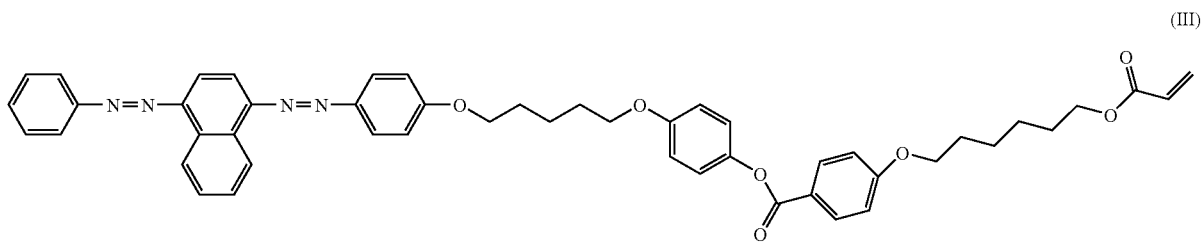 [SMILES: C=CC(=O)OCCCCCCOc1ccc(C(=O)Oc2ccc(OCCCCCOc3ccc(N=Nc4ccc(N=Nc5ccccc5)c5ccccc45)cc3)cc2)cc1]

(III)

The prepared alignment film was spin-coated with the prepared composition for forming a color filter layer, which then had a coating thickness of 1 μm when it was dried. Then, the spin-coated composition was dried at 50° C. for one minute to align liquid crystal molecules. The non-aligned film was exposed for 5 seconds to non-polarized UV rays from a high-pressure mercury lamp with 200 mW/cm$^2$ to firmly maintain aligned state of liquid crystals, thereby preparing a color filter array plate.

Example 2

A color filter array plate was prepared in the same manner as in Example 1, except that the dichroic dye prepared in Synthetic example 2 was used instead of the dichroic dye prepared in Synthetic example 1.

Example 3

A color filter array plate was prepared in the same manner as in Example 1, except that the dichroic dye prepared in Synthetic example 3 was used instead of the dichroic dye prepared in Synthetic example 1.

Comparative Example 1

Glass plates were spin-coated respectively with the pigment-dispersed color resists R, G and B (SH2 410R™ SH2 310G™ and SH2 210R™ (all commercially available from LG CHEM Ltd.) were used as a red pigment, a green pigment, and a blue pigment, respectively.), which then had a coating thickness of 1 μm when they were dried. Then, the spin-coated composition was dried in a 90° C. hot plate for two minutes (a prebaking process). Then, the composition was baked in a 230° C. clean oven for one hour, and then exposed for 5 seconds to UV rays from a high-pressure mercury lamp with 230 mW/cm$^2$ to form a color filter layer.

Experimental Example 1

Comparison of Contrast Ratio

Contrast ratios of the color filters in the color filter array plates prepared in Examples 1 to 3 and Comparative example 1 were measured as brightness ratios of brightness of the color filter array plates as disposed between the two polarizers that are horizontally positioned each other to brightness of the color filter array plates as disposed between the two polarizers that are vertically positioned each other. The results are listed in the following Table 1.

TABLE 1

| | | White (Horizontal Polarizers) | Black (Vertical Polarizers) | Contrast ratio |
|---|---|---|---|---|
| Example 1 | | 0.6285 | 0.0034 | 184.24 |
| Example 2 | | 0.787 | 0.0028 | 282.54 |
| Example 3 | | 0.858 | 0.0019 | 458.42 |
| Comparative | Red | 0.996 | 0.0059 | 162.42 |
| example 1 | Green | 0.992 | 0.0061 | 152.07 |
| | Blue | 0.9076 | 0.0074 | 122.54 |

As shown in Table 1, it was revealed that the color filter array plates prepared in Examples 1 to 3 of the present invention have low brightness between the vertically arranged polarizers and a high contrast ratio of 180 or more, but the color filters using the pigment-dispersed color resists R, G and B of Comparative example 1 have a low polarizing degree due to the large size of the pigment particles and a low contrast ratio due to the increased brightness between the vertically arranged polarizers.

Experimental Example 2

Comparison of Polarizing Degree

The color filters having a dichroic liquid crystal layer (a color filter layer) optically aligned on the glass plate by the above-mentioned process were measured for polarizing degrees and transmittances at wavelength ranges of the respective dichroic dyes. The color filter of Example 1 had a polarizing degree of 88.0% and a transmittance of 31.7%, as measured at the peak wavelength ($\lambda_{max}$=450 nmm). The color filter of Example 2 had a polarizing degree of 76.5% and a transmittance of 39.5%, as measured at the peak wavelength ($\lambda_{max}$=450 nmm). And, the color filter of Example 3 had a polarizing degree of 87.9% and a transmittance of 47.7%, as measured at the peak wavelength ($\lambda_{max}$=442 nmm).

Meanwhile, the color filters using the pigment-dispersed color resists R, G and B of Comparative example 1 did not have polarization characteristics in a certain direction since their pigment molecules were not aligned in a certain direction as described in Examples 1 to 3, and therefore the color filters had a polarizing degree of 0% at all of the wavelength ranges.

INDUSTRIAL APPLICABILITY

The dichroic dye according to the present invention has excellent polarizing properties due to the structure M with liquid crystal properties, and also has increased durability under hot and humid environments due to the presence of end functional groups. The color filter array plate prepared from the dichroic dye according to the present invention, and the liquid crystal display device including the color filter array plate have enhanced durability under hot and humid environments. Also, the dichroic dye according to the present invention is not in the form of articulate materials such as the conventional pigments, and therefore the polarizing degree and contrast are not deteriorated by scattering when pigments are used instead of the dichroic dye, which leads to the improved contrast ratio, polarizing degree and resolution. The liquid crystal display device according to the present invention has a simplified structure since the liquid crystal display device does not require an additional polarization plate and/or alignment film.

While the present invention has been shown and described in connection with the preferred embodiments, it will be apparent to those skilled in the art that modifications and variations can be made without departing from the spirit and scope of the invention as defined by the appended claims.

The invention claimed is:

1. A dichroic dye of the structure of (reactive end functional group)-L1-M-L2-D, wherein D is a dichroic structure, M is a liquid crystal structure, and L1 and L2 are linking structures which link the reactive end functional group, M, and D, wherein the dichroic structure D is an azo dye having following formula:

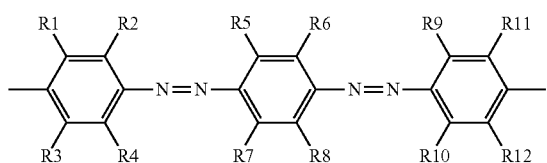

wherein R1-R4 and R7-R12 are substituents selected from the group consisting of hydrogen, C1-C20 straight or branched chain alkyl groups, halogen groups, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C6-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups; and R5 and R6 are coupled to form a phenyl group.

2. The dichroic dye of claim 1, wherein the dichroic structure D has its own liquid crystal properties.

3. The dichroic dye of claim 1, wherein the liquid crystal structure M is at least one selected from the group consisting of:

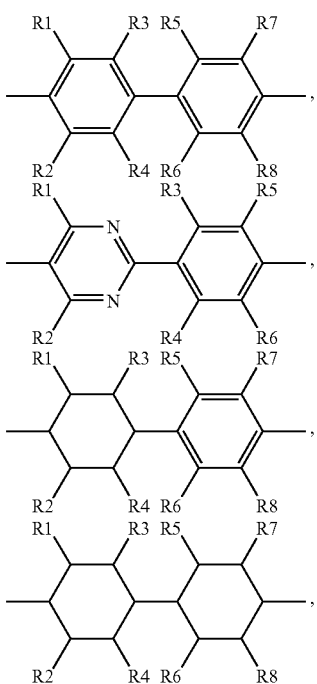

-continued

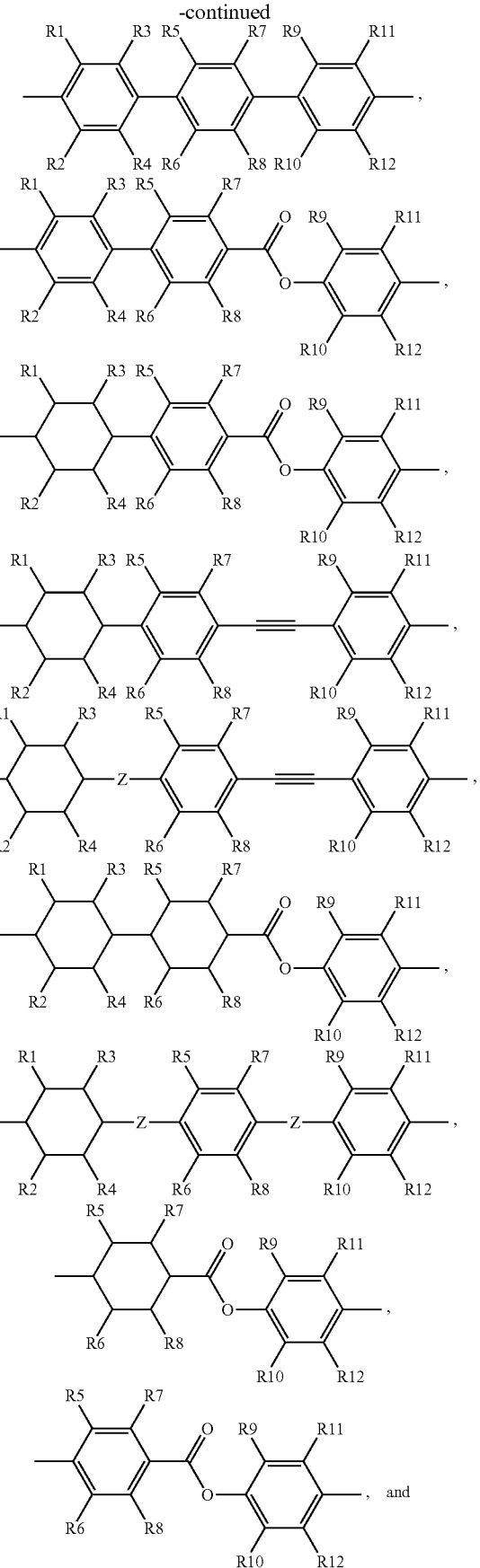

-continued

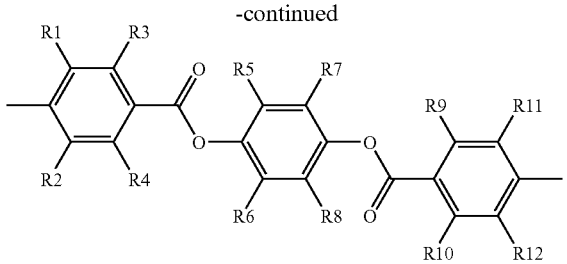

wherein, Z represents —COO—, —OCO—, —CH₂CH₂—, —CH=CH—, —C≡C— or a single bond and R1-R12 are substituents selected from the group consisting of hydrogen, C1-C20 straight or branched chain alkyl groups halogen groups, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C6-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

4. The dichroic dye of claim 1, wherein the reactive end functional group is selected from the group consisting of:

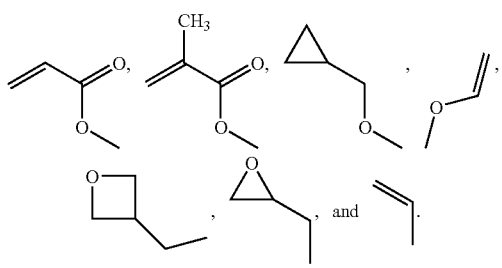

5. The dichroic dye of claim 1, wherein the dichroic dye has a structure of R1-L1-M-L2-D-L3-R2, where an end functional group R2 and a linking structure L3 are further added to the other end of a dichroic dye in which a reactive end functional group R1 and a linking structure L1 are not coupled.

6. The dichroic dye of claim 5, wherein the end functional group R2 is a reactive functional group selected from the group consisting of

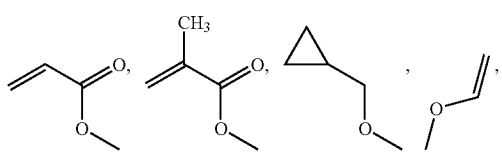

-continued

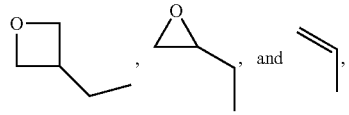

or an unreactive functional group selected from the group consisting of C1-C20 alkyl groups, C1-C20 alkoxy groups, and cyclohexyl groups.

7. The dichroic dye of claim 1, wherein the linking structures are the same or different, and independently selected from the group consisting of

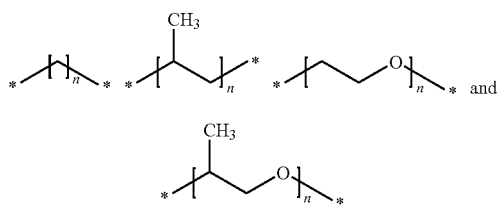

(wherein, n represents integer from 1 to 12).

8. The dichroic dye of claim 5, wherein the linking structures are the same or different, and independently selected from the group consisting of

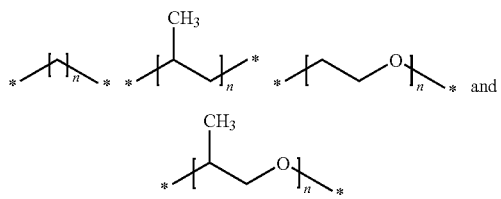

(wherein, n represents integer from 1 to 12).

9. A composition for forming a color filter layer, comprising 1 to 98.85 parts by weight of the dichroic dye defined in claim 1, and 0.15 to 5 parts by weight of other additives.

10. The composition of claim 9, further comprising up to 95 parts by weight of a curable liquid crystal compound.

11. The composition of claim 10, wherein the curable liquid crystal compound comprises ester compounds having acrylate groups.

12. The composition of claim 10, wherein the curable liquid crystal compound is at least one selected from the group consisting of the following Formulas (a) to (d):

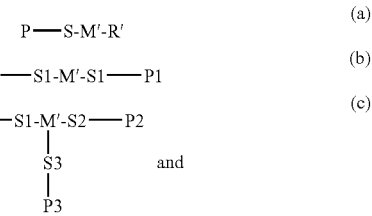

-continued

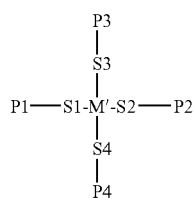
(d)

(wherein, linking structures P-P4 curable functional groups are the same or different, and independently selected from the group consisting of

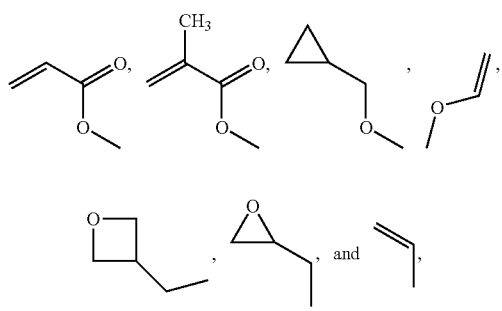

linking structures S-S4 are the same or different, and independently selected from the group consisting of

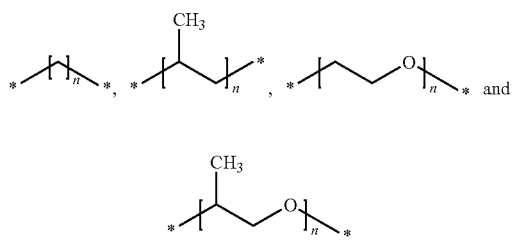

(wherein, n represents integer ranging from 1 to 12), a liquid crystal structure M' is at least one selected from the group consisting of:

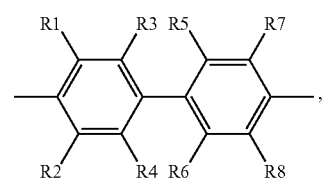

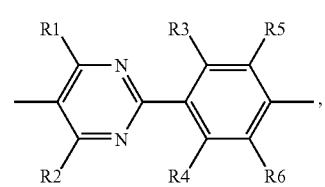

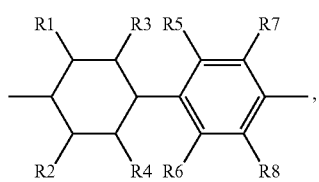

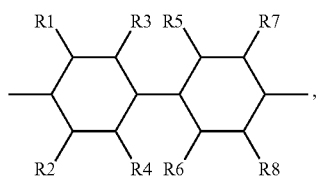

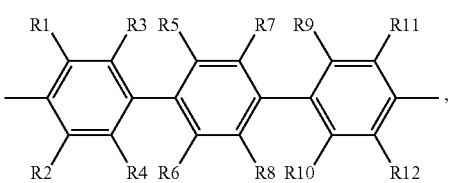

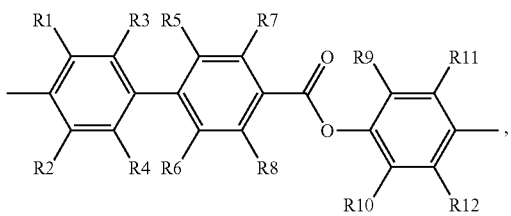

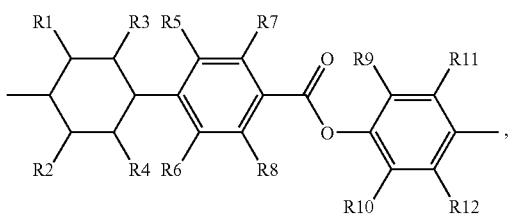

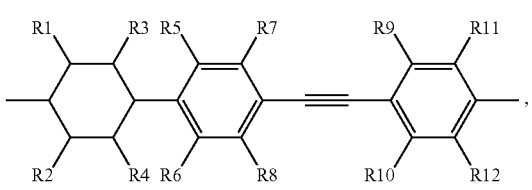

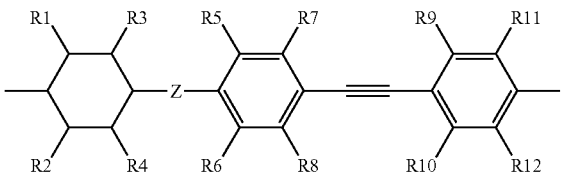

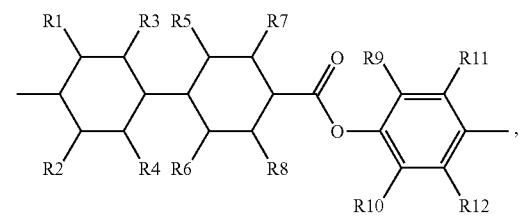

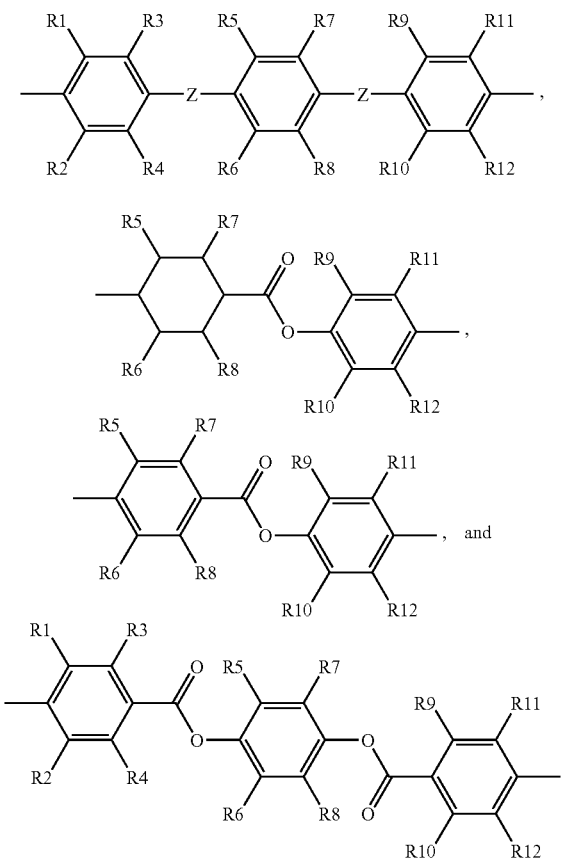

gen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups, and end functional groups R' are at least one selected from the group consisting of H, F, Cl, Br, I, CN, SCN, $SF_5H$, $NO_2$, C1-20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, C1-C20 alkoxy groups, and C1-C20 aliphatic groups).

13. The composition of claim 10, wherein the curable liquid crystal compound is at least one selected from the group consisting of compounds of the following Formulas (1) to (4)

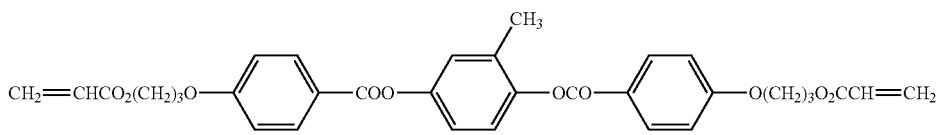

(1)

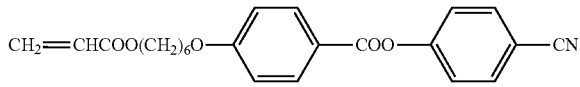

(2)

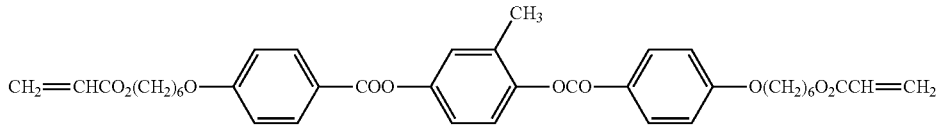

(3)

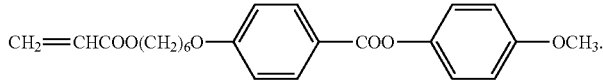

(4)

wherein, Z represents —COO—, —OCO—, —CH₂CH₂—, —CH=CH—, —C≡C— or a single bond and R1-R12 are substituents selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halo- 14. The composition of claim 9, further comprising 1 to 10 parts by weight of a curing agent.

15. A color filter array plate comprising a color filter layer formed of the composition for forming a color filter layer defined as defined in claim 9.

16. The color filter array plate of claim 15, wherein the color filter array plate comprising:

a substrate having orientation; and a color filter layer formed on the substrate and made of the composition.

17. The color filter array plate of claim 15, wherein the color filter array plate comprising:

a substrate;

an alignment film formed on the substrate; and a color filter layer formed on the alignment film and made of the composition.

18. The color filter array plate of claim 15, wherein the color filter layer is coated with a dried film thickness of 0.1-10 μm.

19. A liquid crystal display comprising the color filter array plate defined in claim 15.

20. The liquid crystal display of claim 19, wherein the liquid crystal display does not require a polarization plate and/or an alignment film.

21. The liquid crystal display comprising a upper plate, the color filter array plate defined in claim 15, an electrode, a liquid crystal, a lower alignment film, a lower plate and a lower polarization plate, all of which are formed in sequence as viewed from the top thereof.

* * * * *